US006661346B1

(12) United States Patent
Wood et al.

(10) Patent No.: US 6,661,346 B1
(45) Date of Patent: Dec. 9, 2003

(54) GAS, FIRE AND EARTHQUAKE DETECTOR

(75) Inventors: Raymond Wood, Coquitlam (CA); Gary Anderson, North Vancouver (CA)

(73) Assignee: Gasguard Safety Systems, Inc., Coquitlam (CA)

( * ) Notice: Subject to any disclaimer, the term of this patent is extended or adjusted under 35 U.S.C. 154(b) by 0 days.

(21) Appl. No.: 08/811,059

(22) Filed: Mar. 3, 1997

(51) Int. Cl.$^7$ .......................... G01W 1/00; G08B 21/00
(52) U.S. Cl. ...................... 340/601; 340/628; 340/632; 340/690; 73/579; 73/594; 73/658
(58) Field of Search ................................ 340/628, 629, 340/630, 632, 601, 690; 73/599, 594, 658

(56) References Cited

U.S. PATENT DOCUMENTS

| | | | | |
|---|---|---|---|---|
| 5,101,195 A | * | 3/1992 | Caillat et al. | 340/540 |
| 5,144,598 A | * | 9/1992 | Engdahl et al. | 367/181 |
| 5,447,001 A | * | 9/1995 | Nishimura et al. | 52/167.2 |
| 5,625,348 A | * | 4/1997 | Farnsworth | 340/601 |
| 5,663,501 A | * | 9/1997 | Nakamura | 73/579 |
| 5,742,235 A | * | 4/1998 | Miche | 340/601 |
| 5,929,767 A | * | 7/1999 | Wallick | 340/601 |

* cited by examiner

*Primary Examiner*—Daniel J. Wu
(74) *Attorney, Agent, or Firm*—Barrigar Intellectual Property Group

(57) ABSTRACT

A safety system for a building has an earthquake detector circuit for detecting ground accelerations exceeding a threshold acceleration/frequency curve dividing safe and hazardous ground accelerations throughout a predetermined frequency range. The earthquake detector includes an accelerometer for measuring linear acceleration along an axis, and for generating an acceleration signal indicative of a magnitude of the measured acceleration. A filter circuit produces a filtered acceleration signal from the acceleration signal. The gain/frequency characteristic of the filter circuit is a reflection of the threshold acceleration/frequency curve, such that ground accelerations falling on the threshold acceleration/frequency curve yield a filtered acceleration signal having a substantially constant value throughout the frequency range. Finally, a threshold circuit compares the filtered acceleration signal to a predetermined threshold voltage, and produces an earthquake detected signal indicative of the comparison result. The safety system can also include a gas detector circuit capable of detecting a gas in air, and generating a gas detected signal in response to detection of the gas. A smoke detector circuit can also be provided for generating a smoke detected signal. A main unit including a microprocessor is responsive to the earthquake detected signal, the gas detected signal and the smoke detected signal, and generates a first control signal in response to any of the earthquake detected signal, the gas detected signal and the smoke detected signal. A valve controller closes a gas valve to shut off a supply of gas in response to the first control signal.

11 Claims, 9 Drawing Sheets

GAS, FIRE AND EARTHQUAKE DETECTOR

BACKGROUND TO THE INVENTION

1. Field of the Invention

The present invention generally relates to safety systems for buildings, and in particular to a building safety system which shuts off the supply of gas to a building in the event of any one or more of a gas leak, a fire or an earthquake, and is also useful for the detection from ships of undersea earthquakes.

2. Summary of the Prior Art

Recent major earthquakes have demonstrated that the damage sustained by buildings results from two primary sources, namely the ground accelerations induced by the earthquake itself, and subsequent explosions and fires caused by flammable gas leaking from damaged pipe lines. Many older or poorly-built buildings are destroyed by the ground accelerations. On the other hand, modern buildings, which are properly designed and built in accordance with accepted engineering practice for earthquake-prone regions, typically withstand moderate ground accelerations with comparatively little structural damage. In either type of building, gas pipelines within the building can be damaged or ruptured by the ground accelerations, creating an extreme explosion/fire hazard. This hazard is magnified by the likelihood that water-mains may be severed, hampering fire-fighting efforts. Furthermore, electrical power may also be interrupted, thereby preventing other safety systems from functioning properly, even if these safety systems have not been physically damaged by the earthquake.

According to the California earthquake standards, the degree of hazard posed by ground accelerations is dependent on both the magnitude and frequency of the acceleration. This is illustrated in FIG. 7, which shows the earthquake hazard posed by accelerations at frequencies between 0 and 10 Hz. Ground accelerations falling above the threshold acceleration/frequency curve in FIG. 7 are considered to pose an earthquake hazard and thus should trigger an alarm. Conversely, ground accelerations falling below the threshold acceleration/frequency curve in FIG. 7 are considered to be safe and thus should not trigger an alarm. For example, ground accelerations of 0.3 g (i.e. $0.3 \times 9.81 = 2.94$ m.sec$^{-2}$) or greater at 2.5 Hz are considered to be an earthquake hazard. Accelerations of 0.08 g at 1.0 Hz and 2.5 Hz are considered safe, as are accelerations of 0.4 g at 10 Hz. Accordingly, an earthquake detector must be calibrated to be triggered by ground accelerations of greater than 0.3 g at 2.5 Hz. However, in order to avoid false-alarms, such as by passing vehicles, the detector must not be triggered by acceleration levels which are in the safe zone of the graph of FIG. 7, even if the detected acceleration magnitude is higher than 0.3 g.

U.S. Pat. No. 5,101,195 (Caillat et al.) discloses a motion detector for detecting an earthquake in order to automatically shut off gas supplies to a building in the event of an earthquake. The detector of Caillat et al. includes a highly damped cantilever beam arranged to generate an electrical signal as the end of the beam moves up and down. The signal generated by the moving beam is passed through a band-pass filter, which passes signal frequencies between 3 Hz and 14 Hz. The filtered signal is then passed to a sensor circuit, which produces an alarm signal. It will be noted that the detector of Caillat et al. attenuates low-frequency vibrations, and as such would be substantially incapable of detecting low-frequency earthquake accelerations i.e. at 2.5 Hz, which, as discussed above, are considered by the California earthquake standards to be hazardous.

SUMMARY OF THE INVENTION

An object of the present invention is to provide a reliable building safety system for shutting off a supply of gas to a building in the event of an earthquake.

Another object of the present invention is to provide a building safety system capable of shutting off a supply of gas to a building in the event of a fire or gas leak.

Thus the present invention provides a safety system for a building. The safety system includes an earthquake detector circuit for detecting ground accelerations exceeding a threshold acceleration/frequency curve dividing safe and hazardous ground accelerations throughout a predetermined frequency range. The earthquake detector includes an accelerometer for measuring linear acceleration along an axis, and for generating an acceleration signal indicative of a magnitude of the measured acceleration. A filter circuit produces a filtered acceleration signal from the acceleration signal. The gain/frequency characteristic of the filter circuit is a reflection of the threshold acceleration/frequency curve, such that ground accelerations falling on the threshold acceleration/frequency curve yield a filtered acceleration signal having a substantially constant value throughout the frequency range. Finally, a threshold circuit compares the filtered acceleration signal to a predetermined threshold voltage, and produces an earthquake detected signal indicative of the comparison result.

In a preferred embodiment of the present invention, a main unit including a microprocessor is responsive to the earthquake detected signal, and generates a first control signal in response to the earthquake detected signal. A valve controller can suitably be provided to close a gas valve to shut off a supply of gas to the building in response to the first control signal.

An embodiment of the present invention also includes a gas detector circuit capable of detecting a gas in air, and generating a gas detected signal in response to detection of the gas. In this case, the main unit is also made responsive to the gas detected signal, so as to generate the first control signal in response to the gas detected signal.

Preferably, the gas detector circuit includes both a gas detect portion and a trouble detect portion, so that the gas detector circuit is capable of detecting faulty operation of the gas detector portion, as well as detecting gases in air.

An embodiment of the present invention also includes a smoke detector circuit for generating a fire detected signal. In this case, the main unit is also made responsive to the fire detected signal, so as to generate the first control signal in response to the fire detected signal.

In another embodiment of the present invention, the main unit includes a gas detector combine circuit, which combines the signals of two or more independent gas detector circuits and produces a single gas detector signal line. By this means, a plurality of gas detector circuits can be used, while retaining a single input line to the microprocessor. The gas detector combine circuit preferably includes respective gas detect and trouble detect portions for combining respective gas detected signals and trouble detected signals generated by the gas detectors.

BRIEF DESCRIPTION OF THE DRAWINGS

Further objects features and advantages of the present invention will be more readily apparent from the following detailed description thereof given, by way of example, with reference to the appended drawings, in which.

It will be noted that throughout the drawings, like elements are identified by like reference numerals.

DETAILED DESCRIPTION OF THE PREFERRED EMBODIMENT

Figure 1:
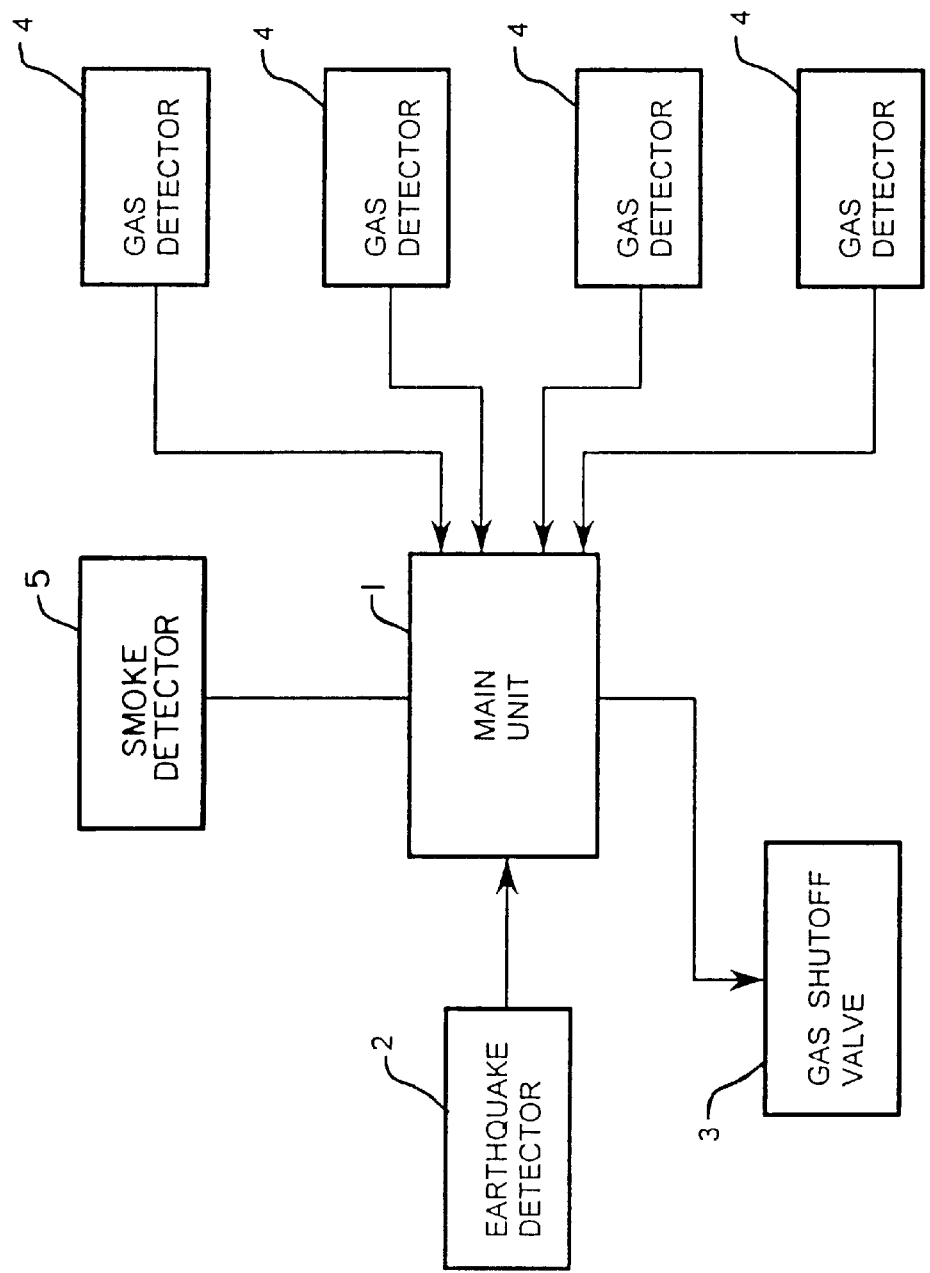
FIG. 1 is a schematic diagram illustrating a safety system according to an embodiment of the present invention.

Referring to FIG. 1, a gas and earthquake detector in accordance with the present invention generally comprises a main unit 1, an earthquake detector circuit 2, a gas shutoff valve 3, one or more gas detector circuits 4 and a smoke detector 5. In the present embodiment, four gas detector circuits 4 are illustrated, although it will be appreciated that more or fewer such circuits may be used.

The main unit 1 can be located at any convenient location within a building, for example in a mechanical equipment room, or near a conventional emergency systems panel typically provided near the main entrance to the building. The earthquake detector 2 can conveniently be located within the main unit 1. Similarly, the gas detector circuit(s) 4 can be installed within the main unit 1 itself, or can be provided at a suitable remote location. However, in order to provide effective protection, the gas detector circuits 4 should be located near potential sources of gas leaks (such as, for example, near gas valves and meters, and near burner equipment such as furnaces and water heaters), and therefore will generally be located remote from the main unit 1. The use of multiple gas detector circuits is advantageous, in that it allows simultaneous gas detection and monitoring at various locations throughout a building.

As with the gas detector circuit(s) 4, the smoke detector 5 can be installed within the main unit 1 itself, or can be provided at a suitable remote location. In order to provide effective fire protection, the smoke detector 5 should be located near potential sources of fire (such as, for example, near gas valves and meters, and near burner equipment such as furnaces and water heaters), and therefore will generally be located remote from the main unit 1.

Figure 2:
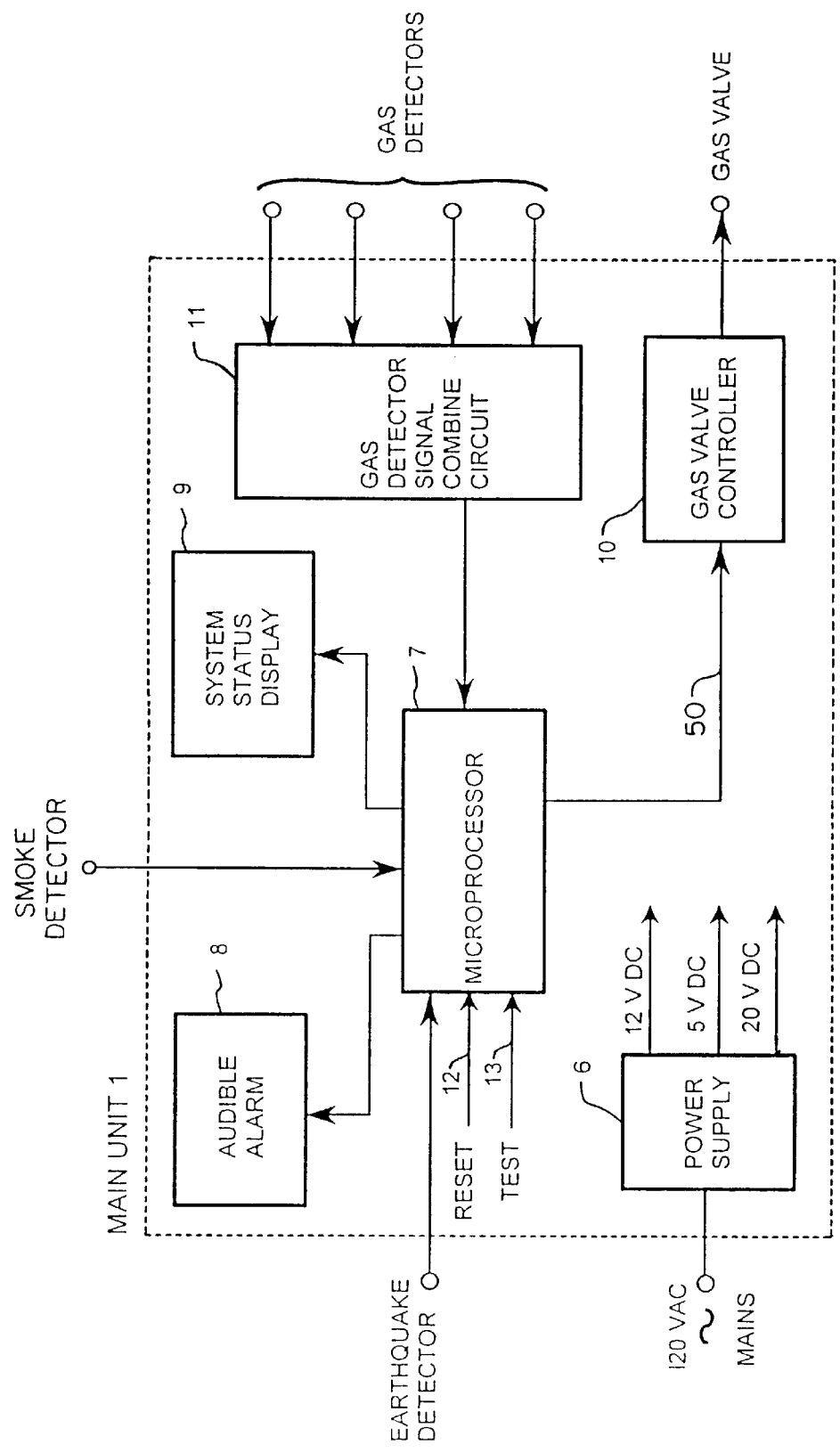
FIG. 2 is a schematic illustration of the main unit of FIG. 1.

Referring to FIG. 2, the main unit 1 comprises a power supply 6; a microprocessor 7 which receives respective inputs from the earthquake detector 2, the gas detectors 4, and the smoke detector 5; an audible alarm 8; a system status display 9; and a valve control circuit 10. A gas detector signal combine circuit 11 is also provided so that multiple gas detectors (in this embodiment four gas detectors) may be used. A system reset line 12 and a system test line 13 are also connected to the microprocessor 7 to allow the gas, fire and earthquake detector system to be reset and tested, as described in further detail below.

The power supply 6 produces three regulated direct current outputs at, for example, 5 VDC, 12 VDC and 20 VDC, and can be connected directly to the mains power supply at, for example, 120 VAC. Alternatively, the power supply 6 can be connected to the mains power supply through a conventional wall adapter, which supplies direct current power at, for example, 12 VDC to the power supply 6. The power supply 6 can conveniently be provided with an internal battery and charger (not shown), so that the system can continue to function in the event of a failure of the mains power supply.

The audible alarm 8 is controlled by the microprocessor 6, and provides an audible alarm indication. A suitable audible alarm can conveniently be provided by a piezo-electric annunciator of the type typically provided in domestic fire alarms. The use of a piezo-electric annunciator is particularly suitable for the audible alarm 8 because it provides a very loud alarm indication, while minimizing power consumption.

The system status display 9 can conveniently be provided by one or more LEDs (not shown), to provide a visual indication of the system status. In this case, a multi-coloured LED can be conveniently arranged so that its color indicates the system status. For example, the LED can be controlled by the microprocessor 7 to emit a green light when the system is operating normally. If a problem is detected with the equipment, the LED can be controlled by the microprocessor 7 to emit an amber light. In the event of an gas leak, fire or earthquake, the LED can be controlled by the microprocessor 7 to emit a red light, so that the system status display 9 also provides a visual alarm indication.

Figure 3:
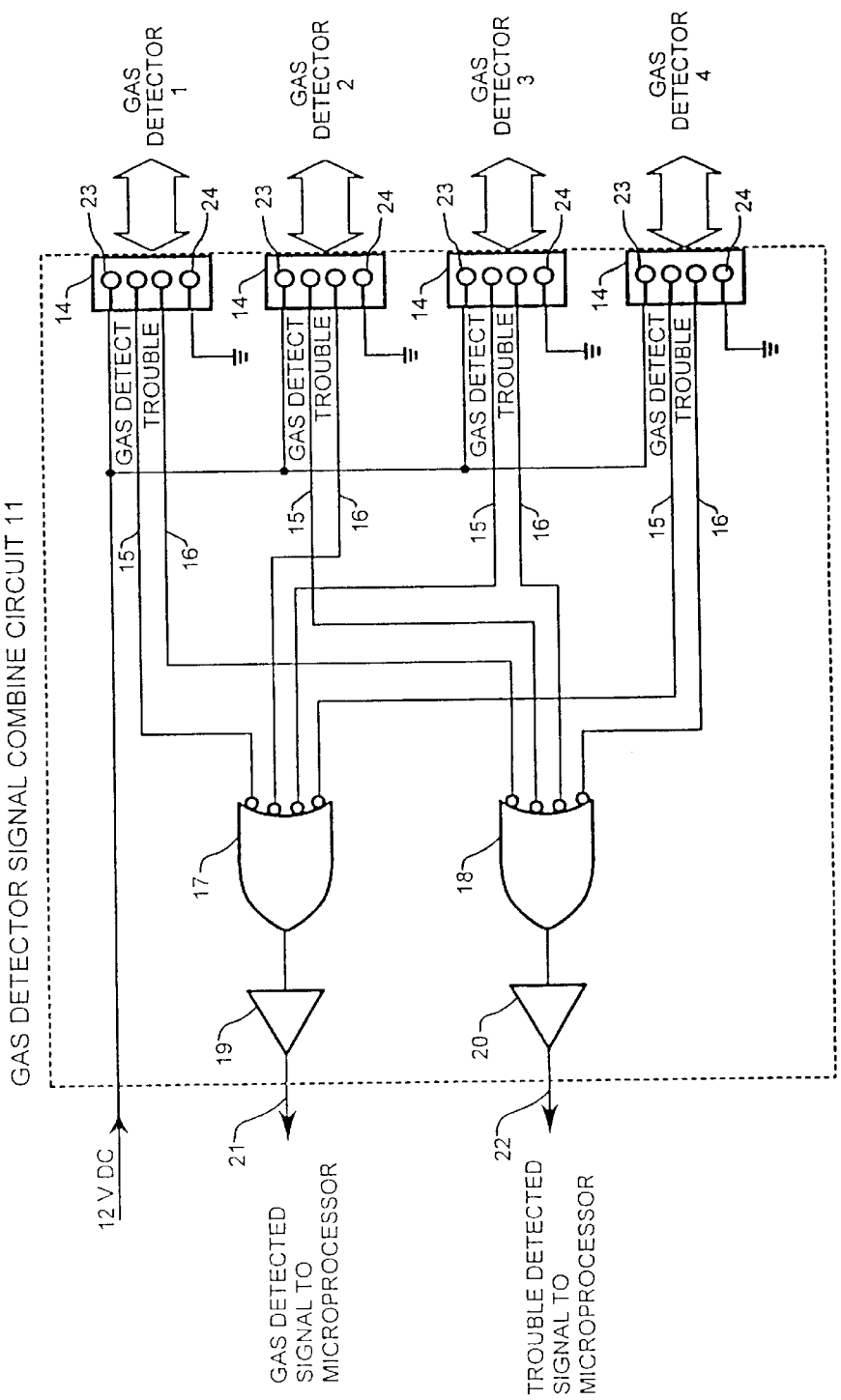
FIG. 3 is a schematic illustration of the gas detector signal combine circuit of FIG. 2.

The gas detector signal combine circuit 11 is designed to receive the respective signals generated by each of the gas detector circuits 4, and to pass a single gas detected signal to the microprocessor 7. As shown in FIG. 3, the gas detector signal combine circuit comprises a respective jack 14 for each gas detector. Each jack 14 includes a gas detect signal line 15, and a trouble signal line 16. These lines are connected to an input of respective gas detect and trouble detect NOR (i.e. logical NOT OR) logic gates 17 and 18, respectively. The output of each NOR gate 17 and 18 is adjusted (either upwards or downwards) by respective voltage level translators 19 and 20, and supplied to a respective input of the microprocessor 7 through combined gas detect line 21 and combined trouble detect line 22. Additionally, each jack 14 includes a 12 VDC supply contact 23 connected to the power supply 5, and a ground contact 24. The 12 VDC supply contact 23 and the ground contact 24 cooperate to provide the respective gas detector circuit 4 with 12 VDC power.

During normal operation of the system, the gas detect line 15 and the trouble detect line 16 of each jack 14 will be maintained at a high voltage level by the respective gas detector circuits. In this case, the combined gas detect line 21 and combined trouble detect line 22 will be at a low voltage level, indicating that no gas leaks are detected, and all of the gas detectors 4 are operating normally.

If a gas leak is detected by any one (or more) of the gas detectors 4, the respective gas detect line 15 is switched to a low voltage level. In response, the combined gas detect line 21 switches to a high level, which indicates to the microprocessor 7 that a gas leak has been detected.

Similarly, if a fault is detected by any one (or more) of the gas detectors 4, the respective trouble detect line 16 is switched to a low voltage level. In response, the combined trouble detect line 22 switches to a high level, which indicates to the microprocessor 7 that a fault has occurred with one of the gas detectors 4.

Figure 4:
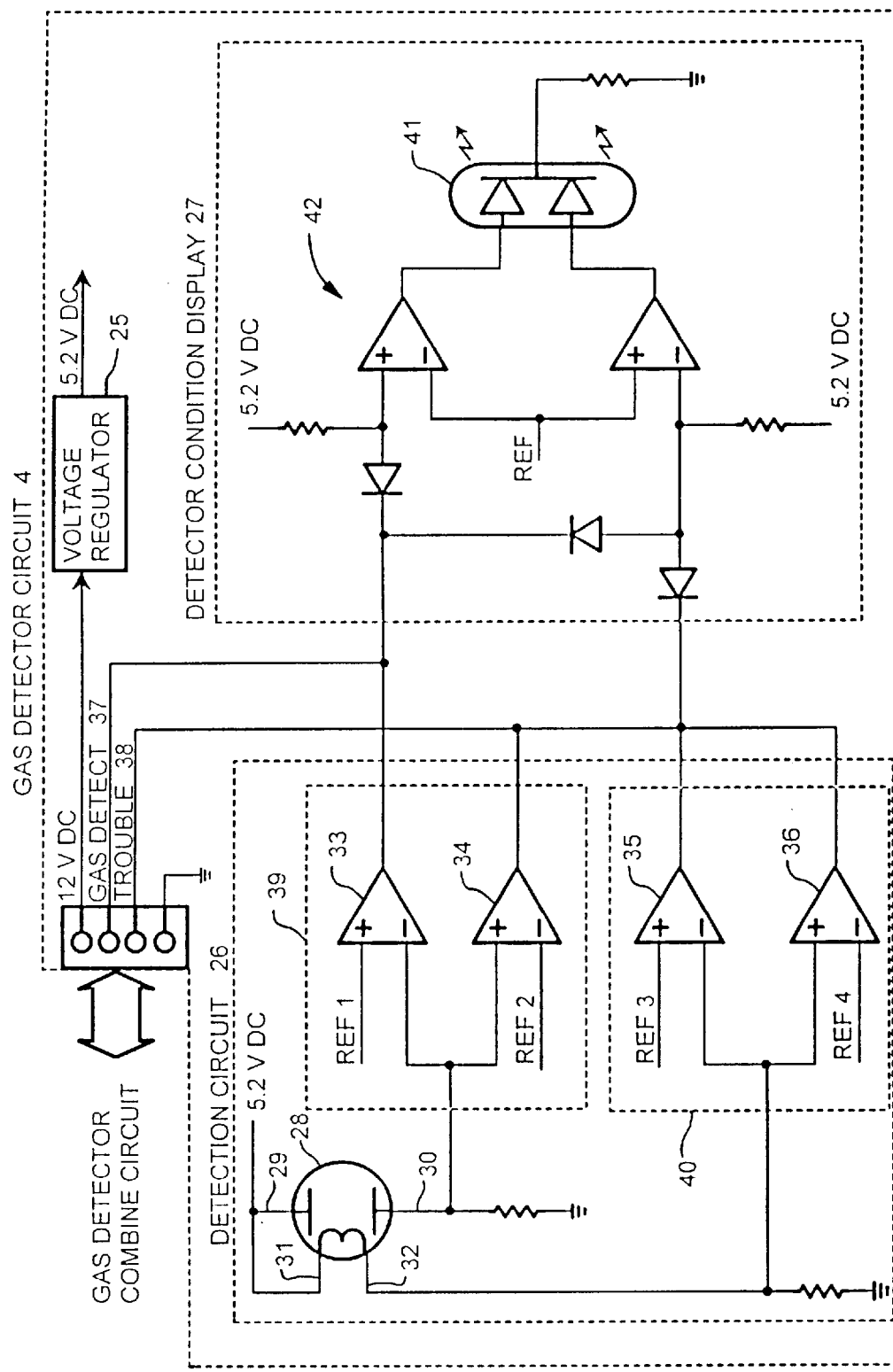
FIG. 4 is a schematic illustration of a gas detector circuit employed in the embodiment of FIG. 1.

Referring to FIG. 4, each gas detector circuit 4 generally comprises a voltage regulator 25, a detection circuit 26 and a detector condition display 27. The voltage regulator 25 receives the 12 VDC power from the power supply 6 of the main unit 1, and outputs a regulated voltage at, for example 5.2 VDC. This regulated voltage is then suitably divided to produce reference voltages REF 1–4, by means of, for example, a voltage divider (not shown). The reference voltages REF 1–4 are used to calibrate the gas detection circuit 26, and to set the threshold limits for gas detection.

The detection circuit 26 comprises a detector element 28 (such as, for example, a FIGARO (trade name), model TGS813, manufactured by ) having first and second conduction plate contacts 29 and 30, and first and second heater element contacts 31 and 32. The first conduction plate and heater element contacts 29 and 31 are connected to the regulated output of the voltage regulator 25. The second conduction plate contact 30 is connected to the inverting input of a first comparator 33, and to the positive input of a second comparator 34. Similarly, the second heater element contact 32 is connected to the inverting input of a third comparator 35, and to the positive input of a fourth comparator 36. The output of the first comparator 33 is connected to the gas detect line 37 of the gas detector circuit 4, and the outputs of the second, third and fourth comparators 34, 35, and 36 are connected to the trouble detect line 38 of the gas detector circuit 4.

The first and second comparators 33 and 34, and the third and fourth comparators 35 and 36 each cooperate to define two window comparators 39 and 40 which compare the voltage levels of the second conduction plate contact 30 and second heater element contact 32 against the reference voltages REF 1 and 2, and REF 3 and 4, respectively. The output voltages of the window comparators 39 and 40 indicate the operational condition of the detector element 28.

In particular, during normal operation, a low current will flow between the conduction plates of the detector element 28, so that the second conduction plate contact 30 will be at a voltage between predetermined high and low levels. If a gas enters the detector element 28, the conductance between the two conduction plates will increase so that the voltage of the second conduction plate contact 30 will rise to a high level. When the voltage of the second conduction plate contact 30 reaches a threshold defined by voltage REF 1, the output of first comparator 33 will go to a low level indicating that gas has been detected. On the other hand, if the voltage of the second conduction plate contact 30 drops to a low level threshold defined by voltage REF 2, then the output of the second comparator 34 will go to a low level indicating that a fault has occurred with the detector element 28.

Similarly, during normal operation a low current will flow through the heater element of the detector element 28, so that the second heater element contact 32 will be at a voltage between predetermined high and low levels. If the voltage of the second heater element contact 32 rises to a high level threshold defined by voltage REF 3, then the output of the third comparator 35 will go to a low level indicating that a fault has occurred with the detector element 28. On the other hand, if the voltage of the second heater element contact 32 drops to a low level threshold defined by voltage REF 4, then the output of the fourth comparator 36 will go to a low level indicating that a fault has occurred with the detector element 28.

The gas detect line 37 and the trouble detect line 38 of the gas detector circuit are connected to respective inputs of the detector condition display 27. The detector condition display 27 is suitably comprised of an LED 41 and an associated driver circuit 42 to provide a convenient visual indication of the operational status of the gas detector circuit 4. For example, in the embodiment illustrated in FIG. 5, when the outputs of all of the first through fourth comparators 33–36 are at a high level, the LED 41 is controlled to emit a green light. When the output of the first comparator 33 switches to a low level indicating gas detected, the LED 41 is controlled to emit a red light. Finally, when the output of any of the second, third or fourth comparators 34, 35 or 36 switches to a low level indicating a fault with the gas detector element 28, the LED 41 is controlled to emit an amber light.

Figure 5:
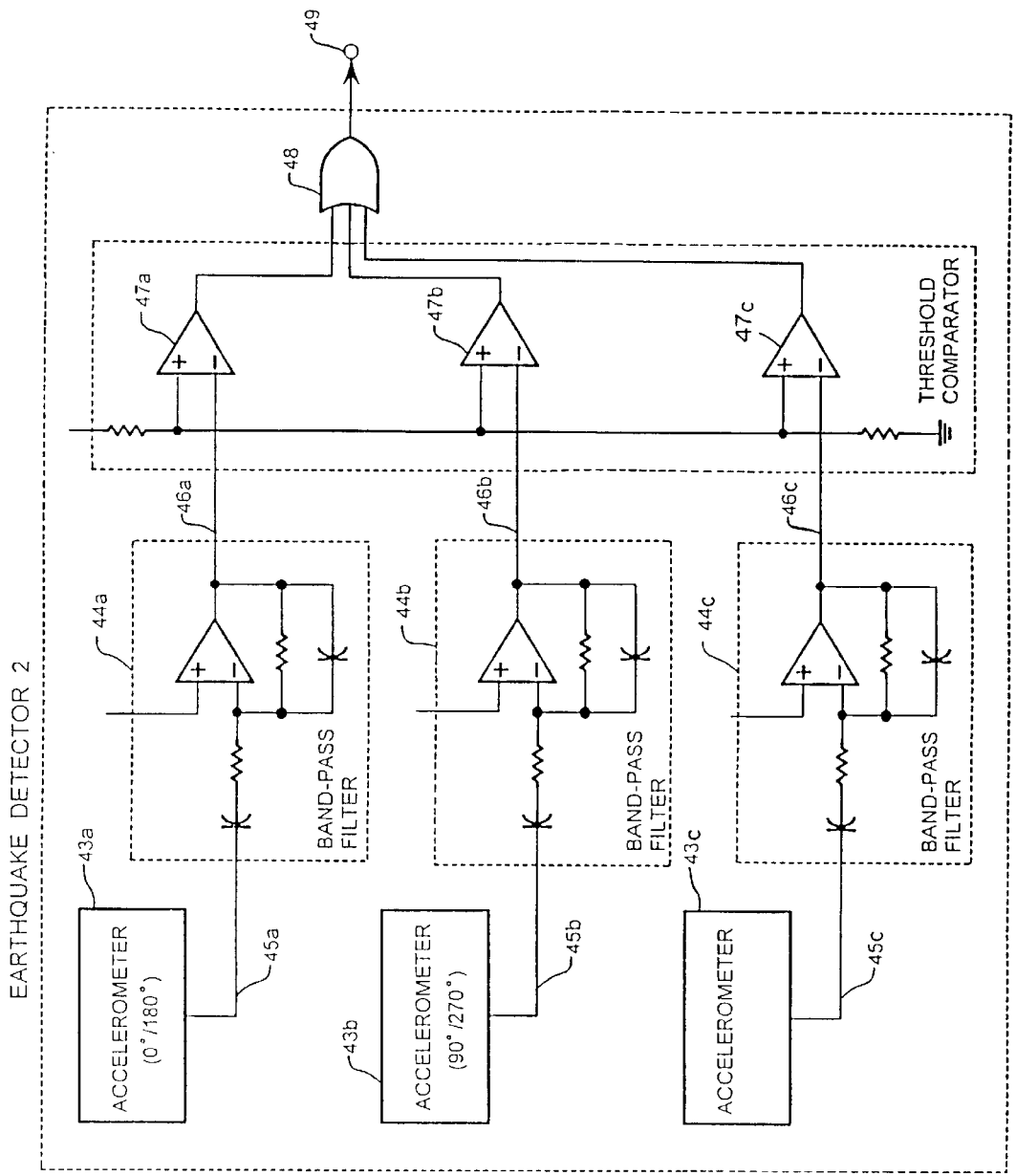
FIG. 5 is a schematic illustration of an earthquake detector circuit employed in the embodiment of FIG. 1.

Referring now to FIG. 5, the earthquake detector 2 is conveniently formed as a "plug-in" board designed to be removably installed within the main unit 1, and is conveniently provided with power, for example at 5 VDC, from the main unit power supply 5. The earthquake detector 2 is formed essentially as an acceleration detection circuit based upon conventional integrated circuit accelerometers 43, such as, for example, model AD-XL05 accelerometers manufactured by Analog Devices. Each accelerometer 43 measures accelerations along one axis. Accordingly, the earthquake detector 2 of the present invention employs three accelerometers 43(*a*), 43(*b*) and 43(*c*) oriented so as to detect accelerations in respective x, y and z orthogonal directions. Preferably, the earthquake detector 2 is installed such that both of the accelerometers 43(*a*) and (*b*) are oriented in a substantially horizontal plane, so that horizontal accelerations in any direction can be detected, and the accelerometer 43(*c*) is oriented in a substantially vertical plane.

Figure 6:
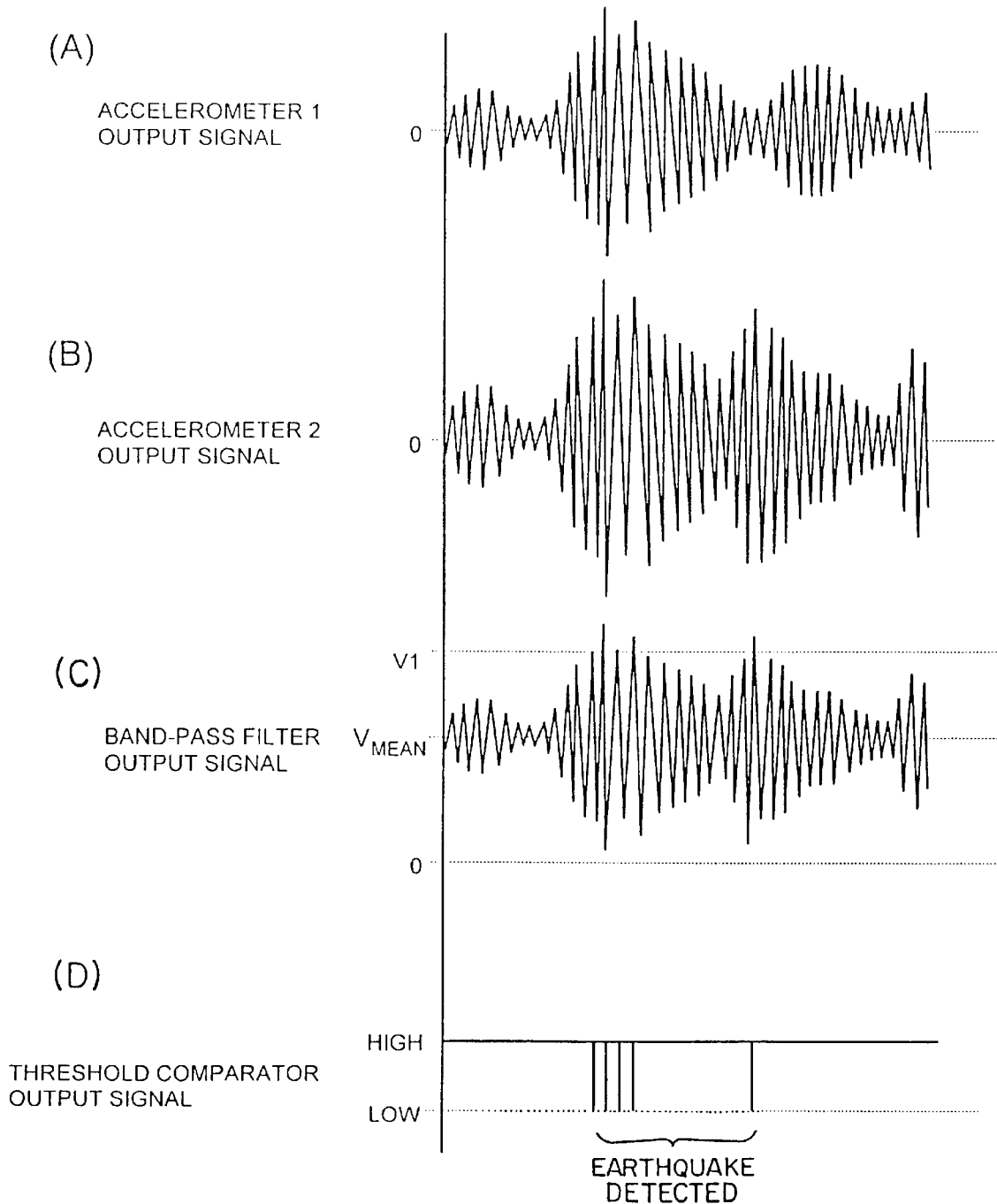
FIGS. 6a–d illustrate the operation of the earthquake detector of FIG. 5.

Each accelerometer 43(*a*) and (*b*) generates a respective accelerometer output signal, as shown in FIGS. 7(A)–7(B), and the accelerometer 43(*c*) generates a corresponding accelerometer output signal (not shown), indicative of lateral ground accelerations in the respective directions of the accelerometers 43(*a*)–(*c*). The accelerometer output signals are supplied to respective band pass filters 44(*a*), 44(*b*) and 44(*c*) through accelerometer output signal lines 45(*a*), 45(*b*) and 45(*c*). The band pass filters 44(*a*)–44(*c*) produce respective filter output signals on filter output lines 46(*a*)–46(*c*). As illustrated in FIG. 6(D), the filter output signals vary about a mean voltage $V_{mean}$. Each filter output signal is supplied to respective threshold comparator 47(*a*)–(*c*) through filter output lines 46(*a*)–(*c*), and compared to threshold voltage V1. If the voltage of any of the filter output signals exceeds the threshold voltage V1, the respective threshold comparator 47 (*a*)–(*c*) generates an earthquake detected signal, illustrated in FIG. 6(E), which is supplied to a respective input of a logical OR circuit 48. The output of the logical OR circuit 48 is supplied as a combined earthquake detected signal to the microprocessor 7 through an earthquake detector line 49. The use of the logical OR circuit 48 allows the use of independent accelerometer/band-pass filter/threshold comparator networks to monitor ground accelerations in orthogonal directions, while requiring only a single earthquake detector line 49 to supply an earthquake detected signal (generated for any one of the accelerometers) to the microprocessor.

As shown in FIGS. 6(D) and 6(E), if the peak value of the filter output signals remains below the threshold voltage V1, the threshold comparators 47 maintain the inputs to the logical OR circuit 48, and consequently also the earthquake detector line 49 at a constant high voltage level. However, if at any instant the level of one of the filter output signals rises above V1, the respective window comparator switch 47(a)–(c) switches the earthquake detector line 49 to a low level, thereby signaling to the microprocessor 7 that a hazardous earthquake has occurred.

Figure 7:
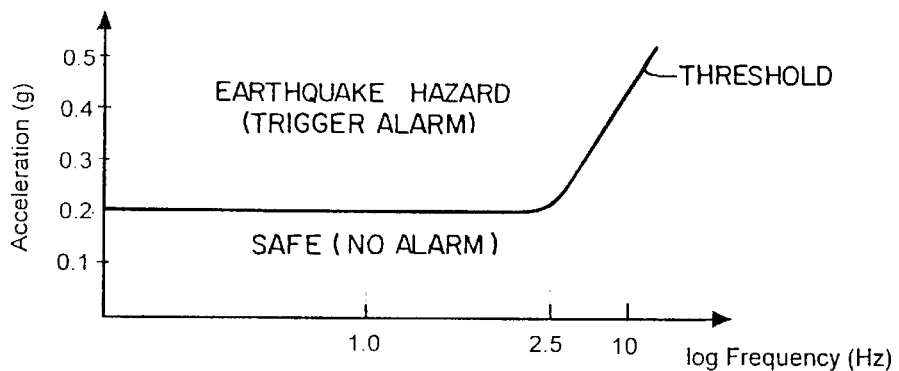
FIG. 7 is a graph showing the threshold acceleration/frequency curve between safe and hazardous ground accelerations.

Accelerations considered to be hazardous are a function of frequency and magnitude. In particular, accelerations of 0.3 g (i.e. 0.3×9.81=2.94 m.sec$^{-2}$) at 2.5 Hz are considered to be an earthquake hazard, whereas accelerations of 0.4 g at 10 Hz and 0.08 g at 2.5 Hz are considered safe. This is illustrated in FIG. 7, which shows the earthquake hazard posed by accelerations at frequencies between 0 and 10 Hz. Ground accelerations falling above the threshold acceleration/frequency curve in FIG. 7 are considered to pose an earthquake hazard and thus should trigger an alarm. Conversely, ground accelerations falling below the threshold acceleration/frequency curve in FIG. 7 are considered to be safe and thus should not trigger an alarm.

Figure 8:
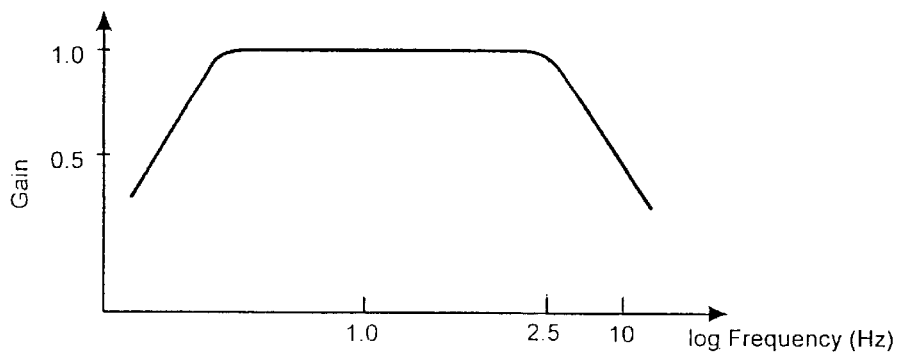
FIG. 8 is a graph showing the gain/frequency characteristic of the band pass filter employed in the earthquake detector of FIG. 5.
Figure 9:
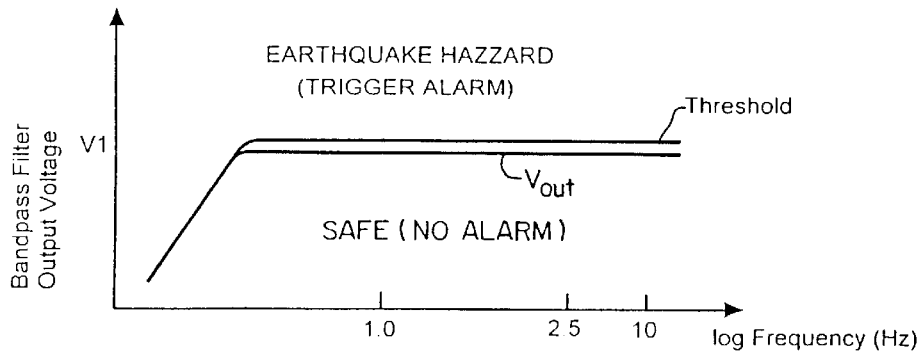
FIG. 9 is a graph showing the filtered acceleration signal generated by the band pass filter of FIG. 5 in response to ground accelerations falling on the threshold acceleration/frequency curve of FIG. 7.

The band pass filters 44 are designed to pass accelerometer output signal frequencies within a range of approximately 0.1 Hz to 2.5 Hz, and to increasingly attenuate signals below approximately 0.1 Hz, and above 2.5 Hz, as shown in FIG. 8. Thus the gain/frequency characteristic of the band-pass filters 44 is designed to closely match the acceleration/frequency relationship of the threshold acceleration/frequency curve separating hazardous and safe ground accelerations, shown in FIG. 7. Consequently, acceleration/frequency values falling on the threshold acceleration/frequency curve (shown in FIG. 7) will yield a filter output signal Vout having a value which initially increases and, above approximate 0.1 Hz, becomes substantially constant and slightly less than the threshold value, as shown in FIG. 9. By this means, a single threshold voltage (V1) can be used to reliably discriminate between hazardous and safe ground accelerations, without regard to the frequency of those accelerations.

The threshold comparators 47 define the threshold acceleration magnitudes, indicated by the amplitudes of the filter output signals, corresponding with hazardous earthquakes. The threshold voltage V1 is selected so that accelerations which are too low in magnitude to pose a significant earthquake hazard do not generate an "earthquake detected" signal.

For example, the above-mentioned Analog Devices AD-XL05 accelerometers are supplied with 5 VDC power from the power supply of the main unit 1. The respective accelerometer output signals are supplied to the band-pass filters 44, which produce respective time-varying filter output signals having a mean voltage of $V_{mean}$=1.8 VDC. The filter output signals Vout are then supplied to the window comparator and compared with threshold voltage V1=2.2 VDC.

Figure 10:
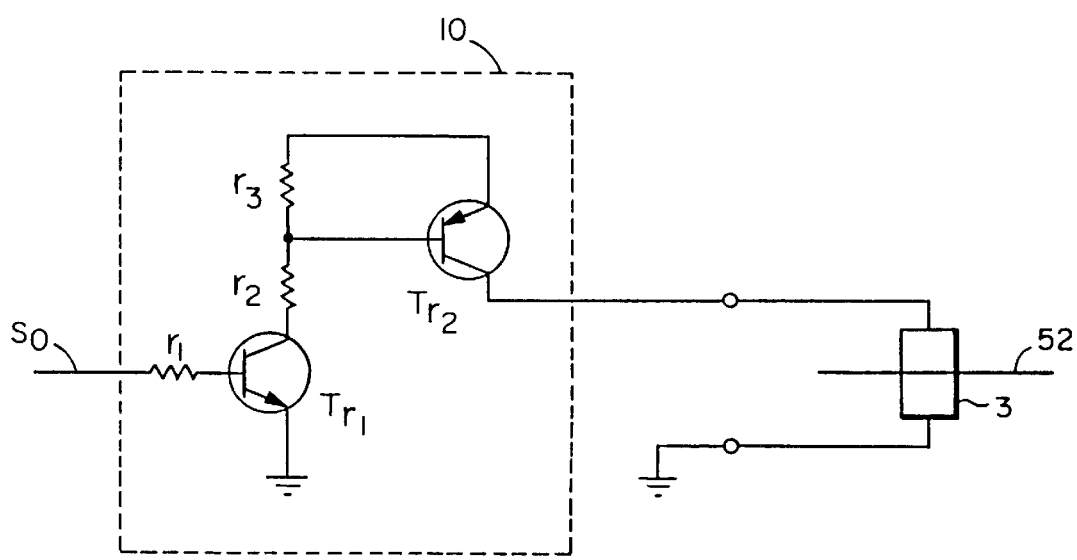
FIG. 10 shows a circuit diagram of a gas valve controller forming part of the main unit shown in FIG. 2 and a gas valve controlled thereby.

A circuit diagram of the gas valve controller 10 of FIG. 2 is shown in FIG. 10. An output line 50 from the microprocessor 7 is connected to an amplifier circuit comprising transistors Tr1 and Tr2 and resistors $r_{1-3}r$, which amplifies pulses from the microprocessor 7 to a level sufficient to operate the gas shut-off valve 3, which is implemented as a solenoid valve. Actuator of the shut-off valve 3 interrupts a supply of gas through a gas line 52.

Figure 11:
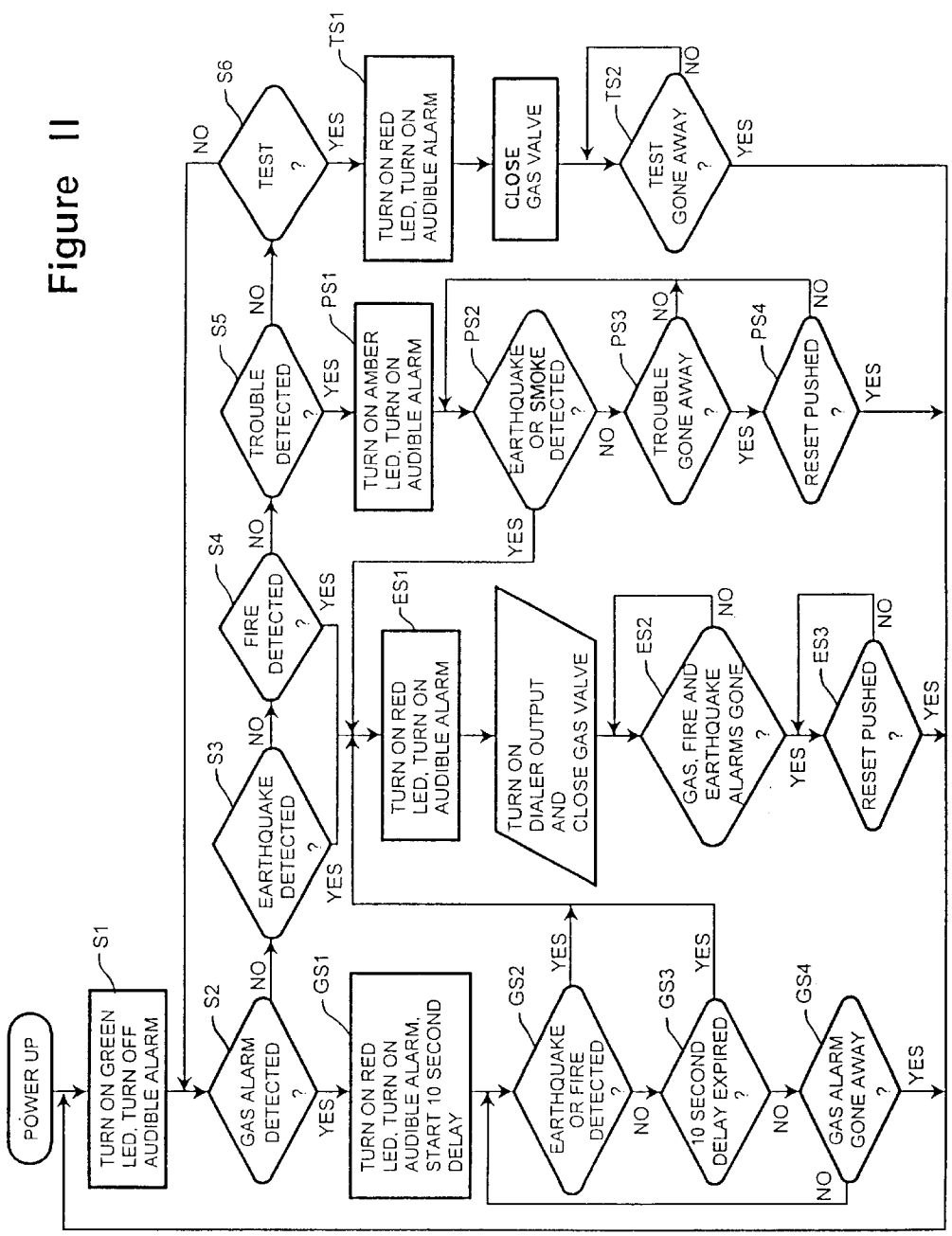
FIG. 11 is a flow chart illustrating the operation of the present invention.

FIG. 11 is a flow chart illustrating the operation of the microprocessor 7 employed in the present invention. Upon initial start-up of the earthquake/gas detector system, the microprocessor 7 performs an initialization sequence at step S1, and turns on the system status display 9 and turns off the audible alarm 8. At step S2, the gas detectors 4 (via the combined gas detect line 21 of the gas detector signal combine circuit 11) are checked for the presence of a gas detected signal. If the result of step S2 is "NO", the system proceeds to step S3, and the earthquake detector signal line 49 is checked for the presence of an earthquake detected signal. If the result of step S3 is "NO", the system proceeds to step S4, and the smoke detector 5 is checked for the presence of a fire detected signal. If the result of step S4 is "NO", the system proceeds to step S5, and the gas detectors 4 (via the combined trouble detect line 22 of the gas detector signal combine circuit 11) are checked for the presence of a trouble signal. If the result of step S5 is "NO", the system proceeds to step S6, and the system test line 13 is checked to determine whether a system test button (not shown) has been pressed. If the result of step S6 is "NO", the system proceeds back to step S2, and the sequence of checks at steps S2–S6 is repeated. Conversely, when the result of any one of the checks performed in steps S2 through S6 are "YES", the system proceeds as described below.

Earthquake or Fire Detected

When an earthquake detected signal is found at step S3, or when a fire detected signal is found at step S4, the microprocessor proceeds immediately to its earthquake/fire alarm sequence at step ES1. In the example embodiment, the system status display 9 is controlled to emit a red light; the audible alarm 8 is activated; the dial output is activated, and the gas valve controller 10 is triggered to close the gas shut-off valve 3. The microprocessor 7 then proceeds to step ES2 where the earthquake and combined gas detector signal lines 49 and 21, respectively, and the smoke detector 5, are repeatedly checked for the presence of either an earthquake detected signal, a gas detected signal, or a fire detected signal. If any one of an earthquake detected signal, a gas detected signal or a fire detected signal are detected at step ES2, the system repeats the check. When none of an earthquake detected signal, a gas detected signal or a fire detected signal are found at step ES2, the microprocessor 7 proceeds to step ES3, where the system reset line 12 is repeatedly checked to determine whether the system reset button (not shown) has been pressed. When the result of the check at step ES3 is "YES", the microprocessor 7 returns to step S1, and re-initializes the system.

Gas Detected

When a gas detected signal is found at step S2, the microprocessor 7 proceeds to its initial gas alarm sequence at step GS1. In the example embodiment, the system status display 9 is controlled to emit a red light; the audible alarm 8 is activated; and a ten second delay is initiated. The microprocessor 7 then proceeds to step GS2 where the earthquake detector signal line 49 is checked for the presence of an earthquake detected signal, and the smoke detector 5 is checked for the presence of a fire detected signal. If either an earthquake detected signal or a fire detected signal is found at step GS2, the microprocessor 7 proceeds immediately to the earthquake alarm sequence at step ES1, and continues through the successive steps ES2 and ES3 as described above. If the result of the check at step GS2 is "NO", the microprocessor 7 proceeds to step GS3, where the 10 delay is checked. If the 10 second delay has expired, the microprocessor 7 proceeds immediately to the earthquake alarm sequence at step ES1, and continues through the successive steps ES2 and ES3 as described above. Alternatively, if the 10 second delay has not expired, the microprocessor 7 proceeds to step GS4, where the combined gas detect line 21 is again checked for the presence of a gas detected signal. If a gas detected signal is found at step GS4, the microprocessor 7 returns to step GS2, and the sequence of checks at GS2, GS3 and GS4 are repeated. If a gas detected signal is not found at step GS4, the microprocessor 7 returns to step S1, and re-initializes the system.

Trouble Detected

When a trouble detected signal is found at step S5, the microprocessor 7 proceeds to its initial trouble alarm sequence at step PS1. In the example embodiment, the system status display 9 is controlled to emit an amber light, and the audible alarm 8 is activated. The microprocessor 7 then proceeds to step PS2 where the earthquake detector signal line 49 is checked for the presence of an earthquake detected signal and the smoke detector 5 is checked for the presence of a fire detected signal. If either an earthquake detected signal or a fire detected signal is found at step PS2, the microprocessor 7 proceeds immediately to the earthquake/fire alarm sequence at step ES1, and continues through the successive steps ES2 and ES3 as described above. If the result of the check at step PS2 is "NO", the microprocessor 7 proceeds to step PS3, where the combined trouble detect line 22 is again checked for the presence of a trouble detected signal. If a trouble detected signal is found at step PS3, the microprocessor 7 returns to step PS2, and the sequence of checks at PS2 and PS3 are repeated. If a trouble detected signal is not found at step PS4, the microprocessor 7 proceeds to step PS4 where the system reset line 12 is checked to determine whether the system reset button (not shown) has been pressed. If the system reset button has not been pressed at step PS4, the microprocessor returns to step PS2, and the sequence of checks at PS2, PS3 and PS4 are repeated. When the result of the check at step PS4 is "YES", the microprocessor 7 returns to step S1, and re-initializes the system.

System Test Activated

When the system test button is pressed (step S6), the microprocessor 7 proceeds to its test alarm sequence at step TS1. In the example embodiment, the system status display 9 is controlled to emit a red light; the audible alarm 8 is activated; and the gas valve controller 10 is triggered to close the gas shut-off valve 3. The microprocessor 7 then proceeds to step TS2 where the system test line 13 is repeatedly checked do determine whether the system test button (not shown) is still being pressed. When the system test button is released, the microprocessor 7 returns to step S1, and re-initializes the system.

It will be appreciated that the present invention is not limited to the example embodiment described above, but may be varied without departing from the scope of the appended claims.

For example, in the above-described embodiment, the gas detector signal combine circuit 11 is provided with jacks for connection with four gas detector circuits. It will be appreciated that more or fewer such jacks may be provided. Further, it will be apparent that one or more jacks may be unused in a particular installation. Finally, it will be understood that different types of gas detectors (such as, for example, natural gas, propane, or CO detectors) may be suitably connected to the jacks, and that gas detectors of more than one type may be used in combination to allow simultaneous detection of more than one type of gas.

I claim:
1. A safety system for a building comprising:
   an earthquake detector circuit for detecting ground accelerations exceeding a threshold acceleration/frequency curve dividing safe and hazardous ground accelerations throughout a predetermined frequency range, the earthquake detector comprising:
   a) an accelerometer for measuring linear acceleration along an axis, and generating an acceleration signal indicative of a magnitude of the measured acceleration;
   b) a filter circuit for producing a filtered acceleration signal from the acceleration signal, a gain/frequency characteristic of the filter circuit being a reflection of the threshold acceleration/frequency curve, such that ground accelerations falling on the threshold acceleration/frequency curve yield a filtered acceleration signal having a substantially constant value throughout the frequency range; and
   c) a threshold circuit for comparing the filtered acceleration signal to a predetermined threshold voltage, and for producing an earthquake detected signal indicative of the comparison result.

2. A safety system for a building as claimed in claim 1, further comprising a main unit responsive to the earthquake detected signal, and capable of generating a first control signal in response to the earthquake detected signal.

3. An safety system for a building as claimed in claim 2, further comprising a gas detector circuit capable of detecting a gas in air, and generating a gas detected signal in response to detection of the gas; the main unit being responsive to both the gas detected signal and the earthquake detected signal, and generating the first control signal in response to either one of the gas detected signal and the earthquake detected signal.

4. A safety system for a building as claimed in claim 2, further comprising a smoke detector circuit capable of generating a smoke detected signal in response to detection of smoke; the main unit being responsive to both the smoke detected signal and the earthquake detected signal, and generating the first control signal in response to either one of the smoke detected signal and the earthquake detected signal.

5. A safety system for a building as claimed in claim 2, further comprising: a gas detector circuit capable of detecting a gas in air, and generating a gas detected signal in response to detection of the gas; and a smoke detector circuit capable of detecting smoke, and generating a smoke detected signal in response to detection of smoke; the main unit being responsive to all of the gas detected signal, the smoke detected signal and the earthquake detected signal, and generating the first control signal in response to any one or more thereof.

6. A safety system for a building as claimed in claim 2, further comprising a gas valve and valve controller capable of closing the gas valve to shut off a supply of gas in response to the first control signal.

7. A safety system for a building as claimed in claim 2, wherein the gas is a flammable gas.

8. A safety system for a building as claimed in claim 7, wherein the gas is either one or both of propane and natural gas.

9. A safety system for a building as claimed in claim 7, wherein the gas detector circuit is operative to generate the gas detected signal when a concentration of the gas in air exceeds 5% of a Lower Explosion Limit.

10. A safety system for a building as claimed in claim 3, wherein a plurality of gas detector circuits are provided, each the gas detector circuit being operative to generate a respective gas detected signal in response to detection of a gas, the main unit being responsive to any of the respective gas detected signals.

11. A safety system for a building as claimed in claim 1, wherein the earthquake detector circuit is operative to generate the earthquake detected signal in response to earthquake-induced accelerations exceeding 0.3 g at 2.5 Hz.

* * * * *